(12) United States Patent
Alfredsson

(10) Patent No.: US 7,479,084 B2
(45) Date of Patent: Jan. 20, 2009

(54) RANGE GEARBOX

(75) Inventor: Sverker Alfredsson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/065,691

(22) Filed: Nov. 11, 2002

(65) Prior Publication Data

US 2003/0040393 A1 Feb. 27, 2003

Related U.S. Application Data

(63) Continuation of application No. PCT/SE01/00113, filed on Jan. 23, 2001, now abandoned.

(51) Int. Cl.
*F16H 3/44* (2006.01)
*F16H 37/02* (2006.01)

(52) U.S. Cl. ................... 475/209; 475/299; 475/344

(58) Field of Classification Search ........... 475/209, 475/207, 298, 299, 344, 300
See application file for complete search history.

(56) References Cited

U.S. PATENT DOCUMENTS

| | | | | |
|---|---|---|---|---|
| 3,009,370 A | * | 11/1961 | Frost | 475/300 |
| 4,182,202 A | | 1/1980 | Grey | 74/781 |
| 4,189,960 A | * | 2/1980 | Holdeman John W. | 475/298 |
| 4,440,042 A | * | 4/1984 | Holdeman | 475/269 |
| 4,667,538 A | | 5/1987 | Larsson | 74/785 |
| 4,890,510 A | * | 1/1990 | Inui | 475/226 |
| 4,922,767 A | | 5/1990 | Toshifumi | 74/333 |
| 5,083,993 A | * | 1/1992 | Oun | 475/299 |
| 5,263,906 A | * | 11/1993 | Antonov | 475/257 |
| 5,390,347 A | | 2/1995 | Buri et al. | 475/303 |
| 6,066,062 A | * | 5/2000 | Pigozzi | 475/207 |
| 7,114,585 B2 | * | 10/2006 | Man et al. | 180/65.2 |

FOREIGN PATENT DOCUMENTS

JP 0916872 A1 5/1999

* cited by examiner

*Primary Examiner*—Tisha D Lewis
(74) *Attorney, Agent, or Firm*—Novak Druce +Quigg LLP

(57) ABSTRACT

Range gearbox for motor vehicles adapted to be connected to the output side of a basic gearbox and including planetary gear (7), enclosed in a housing (3), with a sun wheel (9) arranged on an input shaft (5) and engaged with planet wheels (10). The ring gear (14) is selectively lockable in order to establish gearing between the input shaft and the output shaft. Interacting tooth faces of the planetary gear (7) are angled in such a manner in relation to the longitudinal axis of the input shaft (5) and the output shaft (8) so that an axial force arises on the ring gear (14) from gear speed changes during synchronizing, and this force, at least on shifting to the low range position, tends to move the ring gear in the same direction as an external shifting force.

20 Claims, 2 Drawing Sheets

RANGE GEARBOX

CROSS REFERENCE TO RELATED APPLICATIONS

The present application is a continuation of International Application No. PCT/SE01/00113, filed 23 Jan. 2001 and published in English pursuant to PCT Article 21(2), now abandoned, and which claims priority to Swedish Application No. 0001232-8 filed 11 May 2000. Said applications are expressly incorporated herein by reference in their entireties.

BACKGROUND OF INVENTION

1. Field of the Invention

The present invention relates to a range gearbox for motor vehicles and that is intended to be connected to the output side of a basic gearbox. The device includes a planetary gear (arrangement or set), enclosed in a housing, with a sun wheel that is arranged on an input shaft and engages with planet wheels. The planet wheels are carried by a planet wheel carrier connected to an output shaft and engaged with an axially displaceable ring gear by a coupling means or mechanism. The coupling means or mechanism is lockable either in a first coupling position in which it is non-rotatably connected to the housing in order to establish gearing between the input shaft and the output shaft, or in a second coupling position in which it is connected non-rotatably to the input shaft or the output shaft in order to establish direct drive between the shafts.

2. Background

It is typical for vehicle transmissions to include a basic gearbox and a range gearbox coupled to the output side thereof. This is especially true in heavy-duty vehicles in which it is necessary to provide a large number of gearings in order to make it possible to drive within a speed range favorable to the engine when the vehicle is driven at varying speed and under varying load. A range gearbox is usually of a two-shift type; this means that the number of possible gear ratios is doubled when a range gearbox is coupled together with a main gearbox. In one of the two gear ratios occurring in a range gear arrangement, the input shaft is connected to the output shaft, and no gearing takes place in the range gearbox. This position is usually referred to as the high range. In the other gear ratio, the input shaft is connected to the output shaft via a sun wheel, planet wheel and ring gear arrangement, and gearing between the input and output shafts takes place. This position is usually referred to as the low range.

A range gearbox of the type described above is disclosed, for example, in GB 2151316. The device disclosed therein includes a sun wheel connected rigidly to the input shaft, and a planet wheel carrier connected rigidly to the output shaft. The planetary gearbox also has an axially displaceable ring gear which, by coupling means, is lockable either against rotation relative to said housing in order to establish gearing between the input shaft and the output shaft, or against rotation relative to the shafts in order to establish direct drive between the input shaft and the output shaft.

It is desirable that the shifting movement between low range and high range be able to be performed as rapidly and smoothly as possible in order that the speed of the vehicle not be reduced unnecessarily during the shifting operation. As an example, this is of particular importance if the shifting is taking place on an upward gradient. Although shifting is pneumatically assisted, the mass moment of inertia to be accelerated during synchronizing is relatively great. Moreover, the ring gear and associated coupling means are to be moved during the shifting operation, from one coupling position to the other.

SUMMARY OF INVENTION

One purpose of the present invention is to provide a range gearbox of the type described above that facilitates shifting from one coupling position to the other in such a manner that shifting can take place more rapidly, or alternatively by means of simpler operating means. This is especially true with respect to low range which is the shift which takes the longest time, and/or requires the most force.

To this end, a range gearbox configured and operated according to the present invention is characterized in that the interacting tooth faces of the planetary gear are angled in such a manner in relation to the longitudinal axis of the input shaft and the output shaft that an axial force (longitudinal) arises on the ring gear when the speed changes during synchronizing. Further, this force, at least on shifting to the low range position, tends to move the ring gear in the same direction as the external shifting force.

BRIEF DESCRIPTION OF DRAWINGS

The invention is described in greater detail below with reference to illustrative embodiments shown in the accompanying drawings, in which.

DETAILED DESCRIPTION

Figure 1:
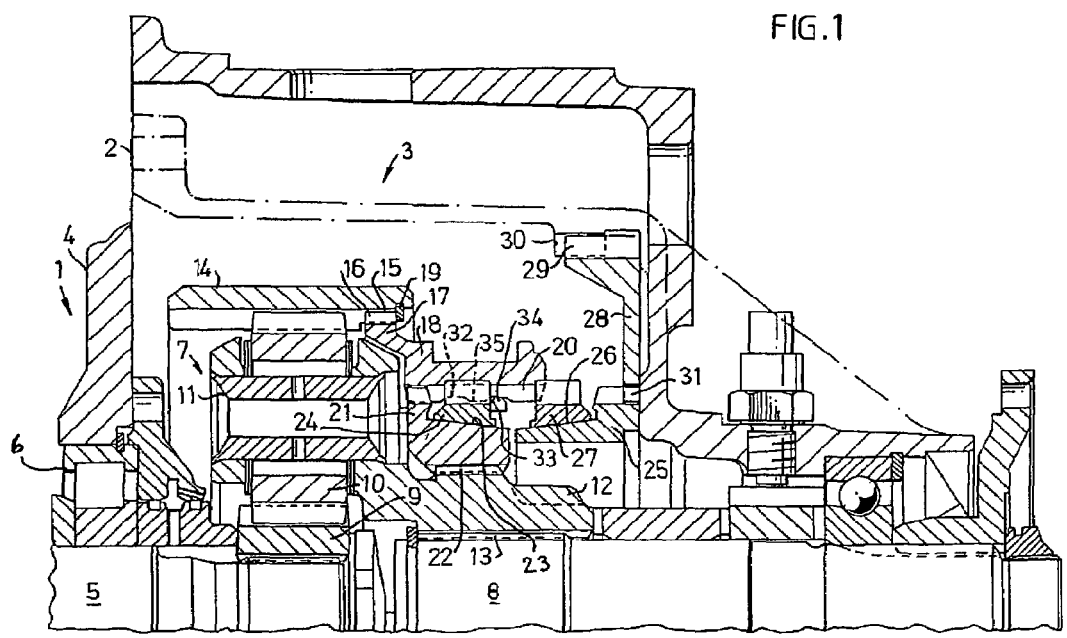
FIG. 1 is a longitudinal section view taken through the upper half of a range gearbox connected to a basic gearbox.

A range gearbox is shown, in part, in FIG. 1. Reference number 1 designates the rear part of the housing of a basic gearbox, to which a flange 2 on a forwardly open housing 3 of a range gearbox is securely bolted. The rear end wall 4 of the housing 1 at the same time forms the front-end wall of the range gearbox housing 3. The basic gearbox has an output shaft 5 that is mounted in a bearing 6 and projects into the housing 3 of the range gearbox. The shaft 5 is coupled, via a planetary gear designated generally by 7, to an output shaft 8 that is provided with a flange for connection to the propeller shaft of the vehicle.

The planetary gear 7 includes a sun wheel 9 that is connected rigidly to the input shaft 5 and engages with planet wheels 10 which are mounted on spindles 11 borne by a planet wheel carrier 12. The planet wheel carrier 12 in turn, via a spline joint 13, is non-rotatably fastened to the output shaft 8. The planet wheels 10 engage with a ring gear 14 that has internal splines 15 that are in engagement with external splines 16 on an annular flange 17 which is preferably made in one-piece with a coupling sleeve 18. A locking ring 19 in a groove in the ring gear 14 axially fixes the parts. The sleeve 18 is axially displaceable by means of a shift fork which is not illustrated, but should be understood to be coupled to a gear shifting mechanism of the vehicle.

The coupling sleeve 18 has internal teeth 20 that, in the position shown in FIG. 1, engage with corresponding teeth on a coupling ring 21 which, via a spline joint 22, is connected non-rotatably to the hub of the planet wheel carrier 12. The coupling ring 21 is designed with a synchronizing cone 23 that bears a synchronizing ring 24 in engagement with the teeth 20 of the coupling sleeve 18. A corresponding toothed coupling ring 25 with a synchronizing cone 26 bearing a synchronizing ring 27 is fixed to the rear end wall of the range gearbox 3 by an annular plate 28 which, with external teeth 29, engages with teeth 30 formed on the inside of the housing 3 and, with internal teeth 31, engages with the teeth of the coupling ring 25.

The teeth 20 of the coupling sleeve 18 have recesses 32 and 33 intended to receive an annular spring 34 which is arranged between the synchronizing rings 24 and 27 and the function of which is to transmit the pressing force from the sleeve 18 to the synchronizing rings during shifting. In principle, the recesses 32 and 33 form a pair of annular grooves between which the spring 34 is moved during shifting, the spring being compressed by the ridge 35 formed between the recesses or grooves during the shifting movement.

Figure 2:
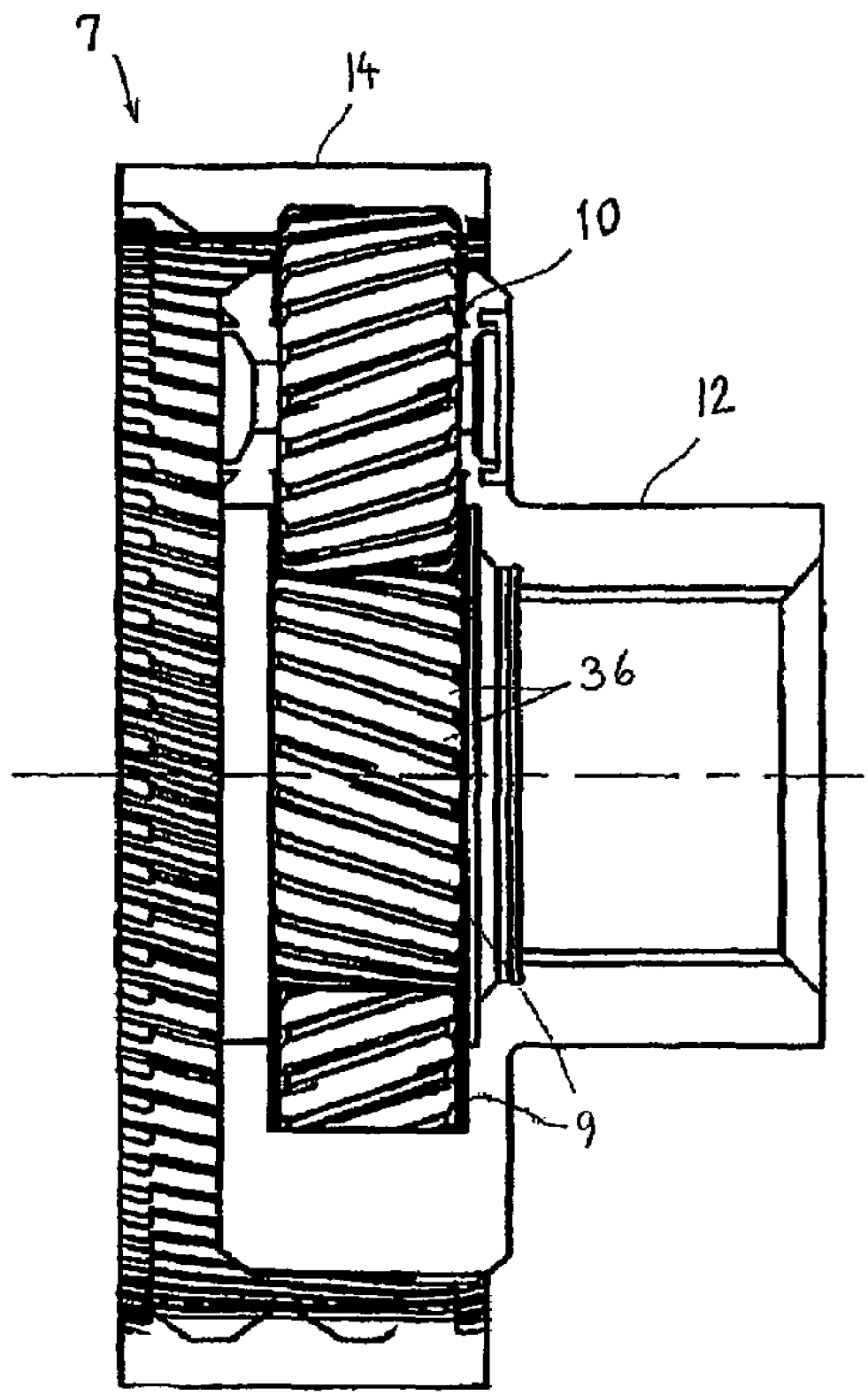
FIG. 2 shows a section through a sun wheel designed according to the invention, and in which the helical tooth is illustrated in detail.

FIG. 2 shows a sector of a ring gear 14 designed according to the invention, with a planet wheel 10 engaging in the ring gear. It can be seen that the interacting tooth, faces of the planetary gear arrangement are angled in relation to the longitudinal axis of the input shaft and the output shaft. By virtue of this oblique angling of the teeth, the transmission noise generated by the mutual interaction of the teeth is reduced. Moreover, the angling of the teeth faces gives rise to axial forces in the planetary gear arrangement.

The sun wheel 9 and the planet wheel carrier 12 are locked in the axial direction in the range gearbox, while the ring gear 14 is displaceable in the axial direction. The axial forces generated by the rotation of the planetary gear arrangement will therefore act on the ring gear. That is to say, two of the three interacting elements are anchored against movement, so forces generated therebetween are left to act on the third, element that is not so anchored. In the illustrative embodiment shown, the sun wheel or gear is assembled to normally rotate clockwise as seen in the direction of the basic gearbox. The angling of the sun wheel teeth 36 is carried out in such a manner that they are angled from left to right as seen in the direction from the basic gearbox.

During synchronizing, the rotation speeds of the ring gear, the planet wheels and the input shaft change. Owing to the mass inertia of these components, a torque is required for this change in speed. This synchronizing torque is brought about in the friction surfaces in the synchronizing unit when external shifting force is applied. A portion of the synchronizing torque is used for changing the speed of the planet wheels and the input shaft. This portion is transmitted in the tooth engagement of the planetary gear arrangement. The teeth in the planetary gear set are angled in relation to the longitudinal axis of the input shaft and the output shaft, and are shown and known as helical teeth. During synchronizing, an axial force then arises on the ring gear. According to the invention, the angling of the teeth is in such a direction that the axial force that occurs on the ring gear augments the external shifting force. In this way, synchronizing and shifting are facilitated.

In the position of the coupling sleeve 18 as shown in FIG. 1, the ring gear 14 is locked against rotation relative to the planet wheel carrier 12 by virtue of the fact that the teeth of the coupling sleeve 18 engage with the teeth of the coupling ring 21. The planetary gear arrangement is therefore locked in the high range position, affecting direct drive between the input shaft and the output shaft.

When shifting to the low range position is to take place, the coupling sleeve 18, and with it the ring gear 14 as well, is displaced to the right in FIG. 1. The sleeve 18 is then first disengaged from the teeth of the coupling ring 21. After a certain displacement distance, the annular spring 34 comes into contact with the opposite synchronizing ring 27 and presses it against the cone 26 of the coupling ring 25. In this way, braking of the coupling sleeve 18 and the ring gear 14 is initiated. When the ring gear is braked, the planet wheels and the input shaft are accelerated via forces from the ring gear teeth, which results in an axial force that is directed to the right in FIG. 1. That is to say, the ring gear tends to move toward the braking cone 26 of the coupling ring 25. In this connection, the braking of the ring gear is speeded up, so that it is synchronized more rapidly with the coupling ring 25. During the continued displacement of the sleeve 18, the spring 34 is compressed by interaction between the inclined edge surfaces of the groove 33 and the spring 34 and is finally displaced over the ridge 35 to the groove 32. In this position, the synchronizing work is finished, and the coupling sleeve 18 can be brought into engagement with the coupling ring 25 in order to lock the ring gear 14 in relation to the housing.

When shifting from the low range position to the high range position is to take place, the coupling sleeve 18, and with it the ring gear 14 as well, is displaced to the left in FIG. 1. The sleeve 18 is then first disengaged from the teeth of the coupling ring 25. After a certain displacement distance, the annular spring 34 comes into contact with the opposite synchronizing ring 24 and presses it against the cone 23 of the coupling ring 21 and acceleration of the coupling sleeve and the ring gear is initiated. When the ring gear is accelerated, the planet wheels and the input shaft are braked via forces from the ring gear teeth resulting in an axial force that is directed to the left in FIG. 1. That is to say, the ring gear tends to move toward the accelerating cone 23 of the coupling ring 21. In this connection, the acceleration of the ring gear is speeded up, so that it is synchronized more rapidly with the coupling ring.

During the continued displacement of the sleeve 18, the spring 34 is compressed by interaction between the inclined edge surfaces of the groove 32 and the spring 34 and is finally displaced over the ridge 35 to the groove 33. In this position, the synchronizing work is finished, and the coupling sleeve 18 can be brought into engagement with the coupling ring 21 in order to lock the ring gear 14 in relation to the planet wheel carrier; that is to say, corresponding to the position shown in FIG. 1.

The invention is not to be considered as being limited to the illustrative embodiments described above, but a number of further variants and modifications are possible within the scope of the patent claims below.

In the illustrative embodiment that is described herein, and shown in FIG. 2, the sun wheel normally rotates clockwise, seen in the direction from a basic gearbox interacting with the range gearbox. It is of course also possible to adapt the invention to a sun wheel that normally rotates counterclockwise, the angling of the tooth faces then also running oppositely to that which has been described.

The invention claimed is:

1. A range gearbox for motor vehicles adapted to be connected to the output side of a basic gearbox, the range gearbox comprising:

a planetary gear (7), enclosed in a housing (3), with a sun wheel (9) arranged on an input shaft (5) and engaged with planet wheels (10), said planet wheels being carried by a planet wheel carrier (12) connected to an output shaft (8) and engageable with an axially displaceable ring gear (14);

said ring gear (14) being selectively lockable, via a coupling means, in a first coupling position in which the gear (14) is non-rotatably connected to the housing in order to establish gearing between the input shaft and the output shaft, and in a second coupling position in which the gear (14) is non-rotatably connected to one of the input shaft and the output shaft in order to establish direct drive therebetween; and interacting tooth faces of the planetary gear (7) are angled in such a manner in relation to the longitudinal axis of the input shaft (5) and the output shaft (8) that an axial force arises on the ring gear (14) from gear speed changes during synchronizing, and this axial force assists movement of the ring gear in the same direction as an external shifting to a low range configuration of the gearbox.

2. The range gearbox as recited in claim 1, wherein the ring gear (14) is connected non-rotatably to a coupling sleeve (18) that is arranged concentrically with the output shaft and serves as a ring gear carrier.

3. The range gearbox as recited in claim 2, wherein the coupling sleeve (18) engages in the first coupling position with a first coupling ring (21) which is fixed in relation to the planet wheel carrier (12) and in the second coupling position with a second coupling ring (25) which is fixed relative to the housing (3).

4. The range gearbox as recited in claim 3, wherein the coupling rings (21, 25) are designed with mutually facing synchronizing cones (23, 26) which each interact with their respective synchronizing ring (24, 27) engaging with the coupling sleeve (18).

5. The range gearbox as recited in claim 4, wherein the synchronizing rings (24, 27) are pressable against the respective synchronizing cone (23, 26) by means of an annular spring (34) which is arranged between the cones and, in one coupling position, is accommodated in a first internal annular groove (32) in the coupling sleeve (18) and, when the coupling sleeve is displaced into the other coupling position, is displaced over to a second internal groove (33) in the sleeve by the synchronizing ring which is active in the second position.

6. The range gearbox as recited in claim 2, wherein the coupling sleeve (18) has an annular flange (17) with external splines (16) which engage with internal splines (15) on the ring gear (14), and in that the coupling sleeve is axially fixed relative to the ring gear by means of a locking ring (19) accommodated in a groove in the ring gear.

7. The range gearbox as recited in claim 6, wherein the extension of the teeth in the ring gear (14) is utilized for splines for rotational locking of the ring gear with the coupling sleeve.

8. The range gearbox as recited in claim 1, wherein normal rotation direction of the sun wheel (9) is clockwise, seen in the direction from a basic gearbox interacting with the range gearbox, the tooth faces of the sun wheel being directed to the right when the sun wheel observed along its axis of rotation.

9. A range gearbox of the planetary-type for a motor vehicle adapted to assist shifting between at least two operating positions, said range gearbox comprising:

a planetary gear arrangement in which a sun gear and planet carrier are anchored against axial movement and a ring gear is axially shiftable between at least two positions for achieving at least two corresponding gear ratios of the range gearbox;

the sun gear, the planet carrier and the ring gear interacting with each other via inter-engaging helical gear teeth; and wherein the inter-engaging helical gear teeth of the planetary gear arrangement are angled in such a manner in relation to a longitudinal axis of an shaft and an input shaft and an output shaft that an axial force arises on the ring gear from gear speed changes during synchronizing, and this axial force assists movement of the ring gear in the same direction as an external shifting force during to a low range configuration of the range gearbox.

10. A range gearbox of the planetary-type for a motor vehicle adapted to assist shifting between at least two operating positions, said range gearbox comprising:

a planetary gear arrangement comprising three components including a sun gear, a planet carrier carrying a plurality of planet gears, and a ring gear; of said three components, at least one is axially shiftable between different axial positions for achieving corresponding different gear ratios of the range gearbox;

said planetary gear arrangement enclosed in a housing and said sun wheel arranged on an input shaft and engaged with said planet gears, said planet gears being carried by said planet carrier connected to an output shaft and engageable with said axially displaceable ring gear;

said ring gear being selectively lockable, via a coupling means, in a first coupling position in which said ring gear is non-rotatably connected to said housing in order to establish gearing between the input shaft and the output shaft, and in a second coupling position in which the ring gear is non-rotatably connected to one of the input shaft and the output shaft in order to establish direct drive therebetween;

interacting tooth faces of the planetary gear arrangement being angled in such a manner in relation to the longitudinal axis of the input shaft and the output shaft that an axial force arises on the ring gear from gear speed changes during synchronizing, and this force, at least on shifting to a low range position, tends to move the ring gear in the same direction as an external shifting force; and the sun gear, the planet carrier and the ring gear interacting with each other via an interactive means for generating a shift-assisting force during gear change.

11. The range gearbox as recited in claim 10, further comprising:

said interactive means for generating a shift-assisting force during gear change directing said shift-assisting force in a substantially axial direction.

12. The range gearbox as recited in claim 10, further comprising:

said sun gear and said planet carrier being anchored against axial movement and said ring gear being axially shiftable between at least two positions for achieving at least two corresponding gear ratios of the range gearbox.

13. The range gearbox as recited in claim 10, further comprising:

said different axial positions corresponding at least to a high range position and a low range position, and said shift-assisting force being generated at least between gear changes from the high range position to the low range position of the range gearbox.

14. The range gearbox as recited in claim 10, wherein the ring gear is non-rotatably connected to a coupling sleeve that is arranged concentrically with the output shaft and serves as a ring gear carrier.

15. The range gearbox as recited in claim 14, wherein the coupling sleeve engages in the first coupling position with a first coupling ring that is fixed in relation to the planet gear carrier and in the second coupling position with a second coupling ring that is fixed relative to the housing.

16. The range gearbox as recited in claim 15, wherein the coupling rings are configured with mutually facing synchronizing cones that each interact with their respective synchronizing ring engaging with the coupling sleeve.

17. The range gearbox as recited in claim 16, wherein the synchronizing rings are pressable against the respective synchronizing cone by means of an annular spring that is arranged between the cones and, in one coupling position, is accommodated in a first internal annular groove in the coupling sleeve and, when the coupling sleeve is displaced into the other coupling position, is displaced over to a second internal groove in the sleeve by the synchronizing ring which is active in the second position.

18. The range gearbox as recited in claim 14, wherein the coupling sleeve has an annular flange with external splines that engage with internal splines on the ring gear, and the coupling sleeve is axially fixed relative to the ring gear by means of a locking ring accommodated in a groove in the ring gear.

19. The range gearbox as recited in claim 18, wherein the extension of the teeth in the ring gear is utilized for splines for rotational locking of the ring gear with the coupling sleeve.

20. A method for providing gear shift-assistance in a range gearbox of the planetary-type for a motor vehicle between at least two operating configurations of the range gearbox, said method comprising:

providing a planetary gear arrangement comprising three components including a sun gear, a planet carrier carrying a plurality of planet gears, and a ring gear; at least one of said three components being axially shiftable between different axial positions for achieving different gear ratios of the range gearbox; and at least two of said three components interacting via helically configured gear teeth, wherein helically configured gear teeth are angled in such a manner in relation to a longitudinal axis of an input shaft and an output shaft that an axial force arises on the ring gear from gear speed changes during synchronizing; and assisting movement of the ring gear in the same direction as an external shifting force during shifting to a low range configuration utilizing the axial force.

* * * * *